(No Model.)

J. F. WITHEY.
SEWER INDUCT AND ITS COVER.

No. 263,448. Patented Aug. 29, 1882.

Witnesses
S. N. Piper
E. B. Pratt

Inventor.
John F. Withey.
by R. H. Eddy att'y

UNITED STATES PATENT OFFICE.

JOHN F. WITHEY, OF LYNN, MASSACHUSETTS.

SEWER-INDUCT AND ITS COVER.

SPECIFICATION forming part of Letters Patent No. 263,448, dated August 29, 1882.

Application filed June 14, 1882. (No model.)

*To all whom it may concern:*

Be it known that I, JOHN F. WITHEY, of Lynn, in the county of Essex, of the State of Massachusetts, have invented a new and useful Improvement in Sewer-Inducts and their Covers; and I do hereby declare the same to be described in the following specification and represented in the accompanying drawings, of which—

Figure 1:
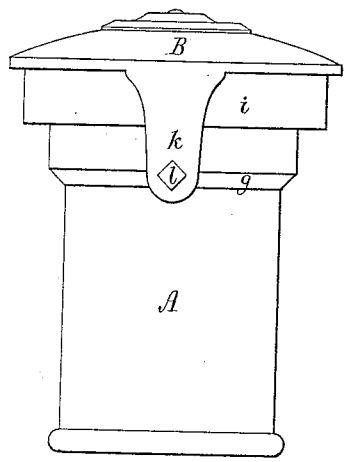
Figure 2:
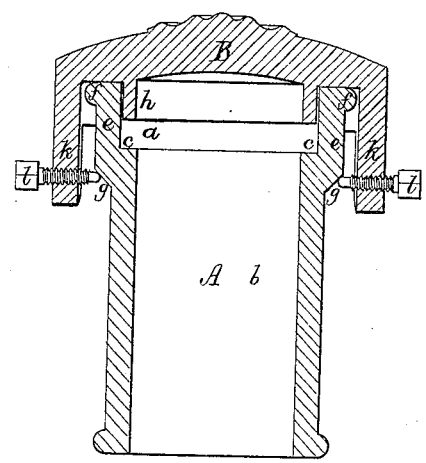
Figure 4:
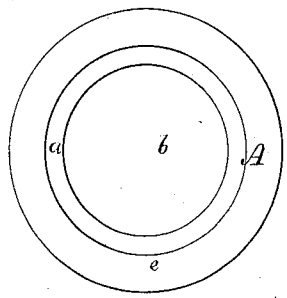
Figure 3:
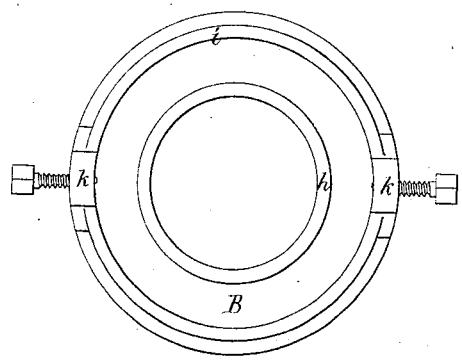

Figure 1 is a front elevation, and Fig. 2 a longitudinal and vertical section, of an induct and its cover provided with my invention. Fig. 3 is an under side view of the cover. Fig. 4 is a top view of the induct.

The nature of my invention is duly set forth in the claims hereinafter presented.

In the said drawings, A denotes an induct or pipe enlarged at its upper end or part, as shown, and having in the enlargement $e$ an annular chamber, $a$, of a diameter larger than that of the bore $b$ of such pipe, the bottom $c$ of the chamber constituting an annular shoulder for the support of a disk when placed on it. The enlargement $e$, at its upper end, is provided with a flange, $f$, projecting outwardly from and around it, and at its lower end it terminates in a conic frustum or annular bevel, $g$.

B is a cap or cover for the upper or enlarged part, $e$, of the induct or pipe A. Such cover has two concentric circular flanges, $h\,i$, projecting down from it, as shown. Furthermore, it also has extending downward from opposite parts of it two ears, $k\,k$, through each of which a screw, $l$, is screwed, as represented. The inner ends of the said screws are to abut against the annular bevel $g$ when the cap is in place on the pipe, in manner as represented, in which case the outer annular flange, $i$, of the cover encompasses the enlargement $e$ of the pipe, and the inner concentric flange, $h$, extends within the enlargement.

The annular space between the two concentric flanges $h\,i$ is intended to hold a packing or cement, which is also to encompass that part of the enlargement $e$ that may extend upward within the outer flange.

The inner flange also serves, when a disk is placed on the bottom of the annular chamber $a$, to hold such disk down upon such bottom. By setting up the screws against the annular bevel the cap or cover will be drawn downward tightly upon the head or enlargement of the induct or pipe. If desirable, there may be more than two ears to the cover, each being furnished with a screw to act against the bevel.

What I claim as my invention is as follows, viz:

1. The sewer induct or pipe provided with the annular bevel, in combination with the cap arranged on the said pipe and provided with the screws to operate against such bevel, as set forth.

2. The cap having the two concentric flanges and the ears and screws, arranged with it as described, in combination with the pipe, having the chambered enlargement, and the annular bevel, to operate with such flanges and screws, as explained.

3. The cap having the two concentric flanges and the ears and screws, arranged with it as explained, in combination with the induct or pipe having the chambered enlargement and its flange and annular bevel, arranged as shown and described.

JOHN F. WITHEY.

Witnesses:
WILLIAM F. NOONAN,
EDWIN J. MEDBERY.